US008548821B2

(12) United States Patent
Sheperd

(10) Patent No.: US 8,548,821 B2
(45) Date of Patent: Oct. 1, 2013

(54) METHOD FOR USING MARKET-BASED SOCIAL NETWORKING WEBSITE TO CREATE NEW FUNDING AND REFERRAL FEES

(76) Inventor: Robert A. Sheperd, San Diego, CA (US)

( * ) Notice: Subject to any disclaimer, the term of this patent is extended or adjusted under 35 U.S.C. 154(b) by 0 days.

(21) Appl. No.: 13/590,141

(22) Filed: Aug. 20, 2012

(65) Prior Publication Data

US 2012/0310755 A1  Dec. 6, 2012

Related U.S. Application Data

(63) Continuation-in-part of application No. 12/427,734, filed on Apr. 21, 2009, now Pat. No. 8,249,995.

(60) Provisional application No. 61/047,316, filed on Sep. 2, 2008.

(51) Int. Cl.
   G06Q 30/02 (2012.01)
   G06Q 10/10 (2012.01)
   G06Q 10/06 (2012.01)
   G06Q 30/06 (2012.01)
   G06Q 10/08 (2012.01)

(52) U.S. Cl.
   USPC ............................................. 705/1.1

(58) Field of Classification Search
   None
   See application file for complete search history.

(56) References Cited

U.S. PATENT DOCUMENTS

| | | |
|---|---|---|
| 6,457,005 B1 | 9/2002 | Torrey |
| 7,680,698 B2 | 3/2010 | Lutnick |
| 7,707,063 B2 | 4/2010 | Monteverde |
| 7,831,917 B1 | 11/2010 | Karam |
| 7,953,644 B2 | 5/2011 | Tracey |
| 8,175,938 B2 | 5/2012 | Olliphant et al. |
| 8,239,255 B2 | 8/2012 | Ficalora |
| 8,249,995 B2 | 8/2012 | Sheperd |
| 2001/0049646 A1* | 12/2001 | Wilkinson ...................... 705/36 |
| 2005/0197953 A1* | 9/2005 | Broadbent et al. .............. 705/38 |
| 2007/0094112 A1 | 4/2007 | DePena |
| 2008/0010152 A1 | 1/2008 | Sennott et al. |
| 2008/0015879 A1* | 1/2008 | Sennott et al. ..................... 705/1 |
| 2008/0222127 A1 | 9/2008 | Bergin |
| 2009/0094239 A1 | 4/2009 | Sabol et al. |
| 2009/0182679 A1* | 7/2009 | Harrington .................... 705/80 |
| 2009/0327013 A1 | 12/2009 | McGovern et al. |
| 2011/0113113 A1 | 5/2011 | Ryan et al. |

* cited by examiner

*Primary Examiner* — Jonathan Ouellette
(74) *Attorney, Agent, or Firm* — Daryl Mueuchau

(57) ABSTRACT

In one embodiment, the method uses a social networking website and employs a monetary incentive to get members of their social network to identify potential funding sources for entities that are growing or need liquidity, wherein a funds seeker and a funds finder, who agree to terms of use of the secure website, act to enter into an exclusive rights contract providing for a contingent referral fee for the funds finder if the terms of the offered contract are met. If the funds seeker is qualified, many offers of introduction will be made. The funds seeker can enter into many exclusive rights contracts, for an equal number of funding sources, but will pay only one referral reward if only one funding source provides funds.

17 Claims, 6 Drawing Sheets

METHOD FOR USING MARKET-BASED SOCIAL NETWORKING WEBSITE TO CREATE NEW FUNDING AND REFERRAL FEES

CROSS REFERENCE TO RELATED APPLICATIONS

This patent application claims priority to abandoned U.S. provisional patent application No. 61/047,316, filed Sep. 2, 2008, and pending U.S. patent application Ser. No. 12/427,734, now U.S. Pat. No. 8,249,995, both of which are incorporated herein by reference in their entireties.

FIELD OF THE INVENTION

The invention relates to a method using an internet-based system to generate a contingent referral fee for an entity, business or person that identifies parties willing to enter into a funding contract or agreement for an entity, business or person seeking a funding source(s).

BACKGROUND OF THE INVENTION

Businesses normally have a variety of funding options when attempting to raise funds. Many smaller and newer firms are locked out of funding options because they don't have the credit-worthiness or connections of individuals or businesses with deep pockets or well-known advisors and board members. This invention offers hope to these firms as monetary incentives are used to attract well-connected and talented individuals to assist in opening up the lines of communication with potential corporate partners with deep pockets, commercial banks, investment bankers, venture capitalists, angel investors, charitable foundations, government agencies, and other funding sources with these firms needing funding.

This invention is intended to monetize the value of social interaction by providing monetary incentives that recognize the increased likelihood of a business transaction if social interaction occurs. Much of life is chance. This invention uses social interaction to improve one's chances. By combining two real estate practices, the contingent referral fee for a listing and the single party show for a For-Sale-by-Owner property, an exclusive rights contract can be formed that pays a referring party a contingent referral fee if a transaction with a single party occurs. The contractual promise of a referral fee incentivizes social match-making of new or existing businesses with potential sources of funding. Successful matches generate referral fees for the matchmakers. The infinite real estate of a website on the internet, the stickiness of social networks, the power of capitalism and entrepreneurship, and the drive of human greed provide the opportunity for making matches and getting paid the contingent referral fee or otherwise rewarded.

The contractual promise of a contingent referral fee can also incentivize social match-making of prospective employees with potential employers and social match-making of businesses with potential customers. The contingent referral fee serves essentially as an X Prize which incentivizes others to think creatively about helping an individual, business or other entity achieve a desired outcome.

SUMMARY OF THE INVENTION

The invention provides a method implemented using a website or a web-based system for obtaining new funds for a funds seeker, and generating a contingent referral fee for a funds finder, comprising the steps of (a) establishing a secure website, wherein the secure website is hosted on a web server that includes an email system and a database that provides email and database search, query and display capabilities for the secure website, wherein the email system and database is internet or remotely accessible; (b) obtaining a funds seeker and a funds finder who agree to terms of use of the secure website; (c) the funds seeker enters into the database the funds seeker's business profile, preferred funding type and amount, preferred funding sources and a contingent referral fee that the funds seeker would pay if the funds seeker obtained a minimum level of funding from a named fund source, which the database stores; (d) the funds finder searches the database, identifies the funds seeker as a potential client and sends an email through the email system to the funds seeker, wherein the email offers an introduction to a company insider(s), optionally the funds finder himself or herself, via an offer system of the secure website thereby offering a single company-exclusive contract with the funds seeker, wherein the offered contract, if accepted by the finds seeker, is stored in the database and wherein said offered contract, if accepted, would obligate the funds seeker to pay a contingent referral fee if the funds seeker is introduced to a company insider by the funds finder, the funds seeker receives funds from the fund source according to the terms of the offered contract, optionally wherein the funds finder is qualified to receive a referral fee under FINRA regulations; (e) the funds seeker responds through the offer system of the secure website to accept one or more of the offers of step (d), thereby establishing a contractual obligation by the funds seeker to pay the contingent referral fee if the funds seeker is introduced and receives funds from the fund source; and optionally (f) the fund source offering the funds seeker a financing contract comprising a financing offer and the funds seeker accepts the financing offer and receives the funds from the named company, wherein the offered contract of step (d) becomes a binding contract, wherein the binding contract obligates the funds seeker to pay the contingent referral fee according to its terms, optionally wherein the secure website is utilized to facilitate paying the contingent referral fee if requested by the funds seeker or the funds finder or required by the terms of the binding contract.

Other embodiments are described in the specification, drawings and claims.

DETAILED DESCRIPTION OF THE INVENTION

Definitions

Figure 1A:
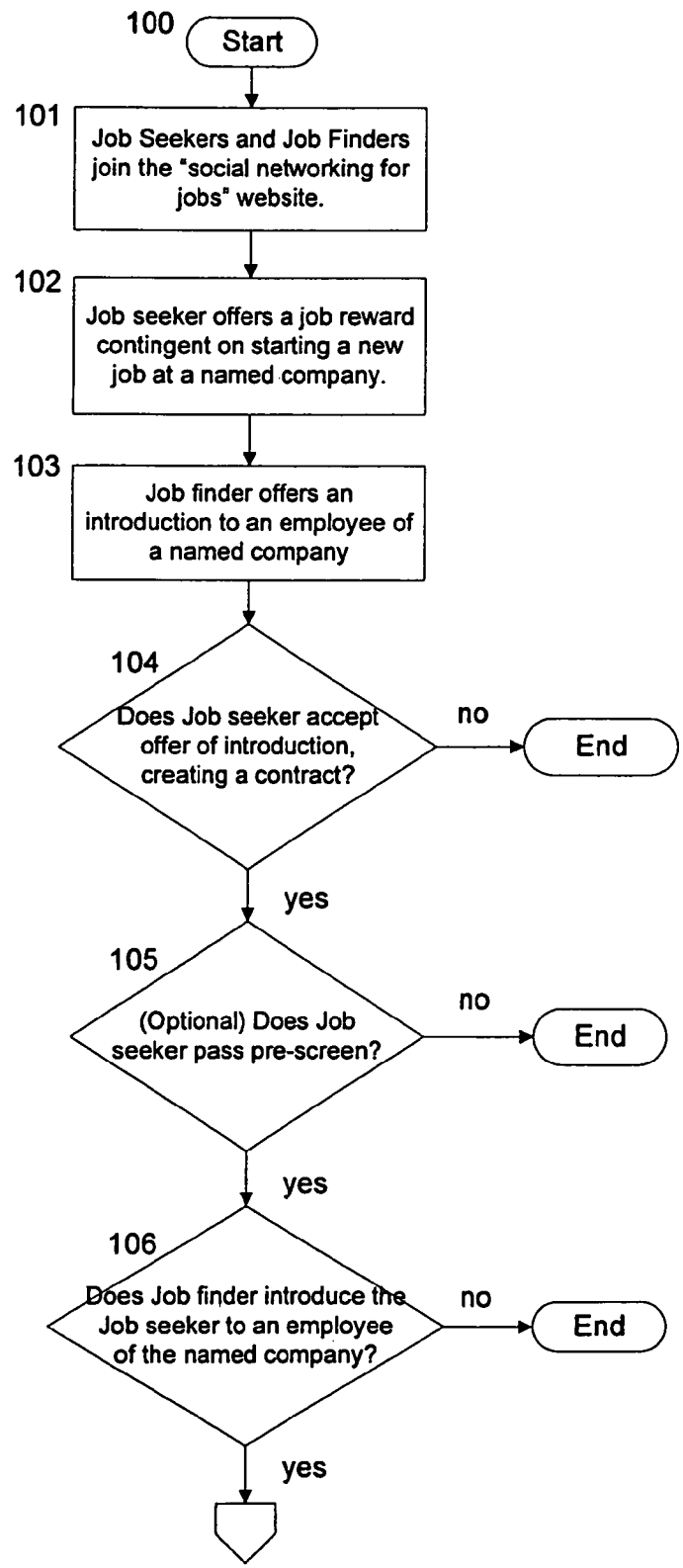
FIG. 1 is a flowchart for an individual or contractor seeking employment. The website promotes and establishes contingent referral fee contracts between a job seeker and a job finder for a personal introduction to an employee at a named company. The referral fee would need to be paid if the job seeker started a job at the named company within the time frame specified in the contract.

As used herein, the word "or" means and/or unless clearly implied otherwise by context or by inclusion of mutually incompatible elements or steps.

The phrase "secure website" or "secure social networking website" means a website that adheres to or uses the widely used communications protocol hypertext transfer protocol secure (HTTPS) or other secure protocols or means for communications or secure transactions, particularly for financial information, transactions or for or individual privacy.

The term "insider" means an employee, consultant or director or a shareowner, optionally a shareholder who holds more than a 5% ownership stake in a company.

The term "special offer coupon" or "coupon" means a coupon that confers a discount, a product or service or something else of value to its holder.

The term entity or legal entity means any individual, commercial entity, e.g., for profit company or corporation or non-profit company or corporation or any government branch, agency, department or other unit.

Description

In some aspects, the invention utilizes monetary incentives to attract well-connected or talented individuals to assist in opening up the lines of communication with investment bankers, venture capitalists, angel investors and other funding sources with firms or individuals who need funding. This monetizes the value of social interaction by providing monetary incentives that recognize the increased likelihood of securing funding for a business or individual if social interaction occurs. By combining two real estate practices, the contingent referral fee for a listing and the single party show for a For-Sale-by-Owner property, an exclusive rights contract can be formed that pays a referring party a contingent referral fee if a transaction with a single party occurs. The contractual promise of a referral fee incentivizes social match-making of businesses with potential customers, prospective employees with potential employers and new or existing businesses with potential sources of funding. Successful matches generate referral fees for the matchmakers. The broad reach of a website on the internet, the stickiness of social networks, human needs and the under-lying power of human traits such as altruism or the drive to fulfill desires provide an opportunity for making matches and receiving compensation or otherwise being rewarded.

This invention is applicable to facilitating transactions in the employment and commercial transactions fields. The process works by applying two real estate concepts to the job market, adding a bid-based profit incentive to internet-based social networking, and segmenting the job market by region and profession. Several other concepts optimize the results of this method, including targeted ads for education and professional organizations, site search, database management of job seekers, job finders and their company contacts, and the jobseeker-job finder contracts, payment methods, a fraud provision in the "terms of use" of the website, a exclusive use clause for sharing the database with prospective employers, and the use of mentoring, digital portfolios, and video resumes.

The two real estate concepts are the "contingent referral fee" and the "single party show" agreements. With the "contingent referral fee", real estate agents contract to pay another real estate agent a referral fee if a sales lead results in a listing agreement. A real estate agent can contract with a home owner to do a "single party show" whereby the agent will get paid a sales commission if they sell the home to a single individual named in the contract. Both agreements are contingent as they contain promises for the second party to pay the first party if a third party enters into a contract with the second party.

In one application, this method uses a jobs-based social networking website and the monetary incentive of a "job reward" to get friends, relatives and other visitors to the website to offer a personal introduction to a company insider in exchange for the exclusive contractual right to receive a contingent referral fee if the introduced person starts a job with the named company within the time period set forth in the contract. Ideally, hundreds if not thousands of people will review a person's profile on the social networking website. If the job candidate is qualified, many offers of introduction will be made. The jobseeker can accept many offers but only one offer of introduction per company or non-profit entity in a given time period. Since the job candidate will only start one job within that relatively short period of time, only one referral fee will need to be paid.

This invention can be applied to several other fields, including acquiring additional customers or funding for a business, as demonstrated by flowchart 2 and flowchart 3. In fact, this technique can be applied to all areas of human endeavor where you can define a successful event or the resolution of a problem and how a person, business or entity might contribute to that success. Some "success" examples are: receiving grant funding for a non-profit or service project, getting an internship in an individual's field, getting an intern from a prestigious university to work for a selected firm, getting a promotion and a raise, finding and getting married to a person who wants the same things you do, getting tutoring and receiving an improved academic grade, adopting a child, getting introduced to a specialist or an alternative medicine practitioner and resolving a health issue, getting an article published in professional journal or magazine, getting a patent granted, fixing your credit report and getting approved for a home loan, getting in on the "friends and family" stock buy-in for startup company, finding an attorney and winning a lawsuit, finding a CFO for your startup who takes the company through a successful IPO, and getting nominated and elected to the board of directors of a large public firm. This invention monetarily motivates friends and family and business associates linked to an individual or business profiled in a social networking website (or even the general public who have access to the social networking website if permitted by the member party seeking a favorable outcome) to find resources for that individual or business and to promote the member's best interests to improve their chances of success in order to receive the reward specified by the contingent referral fee contract with that individual or business.

One object of the invention is to solve or ameliorate the problem of unemployment. This process turns the problems of unemployment and underemployment into a profit opportunity available to anyone. This idea also applies to contractors seeking a contract, vendors and commissioned salespeople looking for sales leads, and businesses and non-profits trying to raise funds. It helps individuals make contacts, develop their talents, interview at top companies, and get their dream jobs. More importantly, this process encourages discussions about redirecting talent to areas of need and growth or applying talent to solve society's problems and add value to the economy. In addition, as this invention is directed more broadly to help individuals and businesses become more successful and to solve their individual and collective problems, opportunities will arise to engage people's talents to become better educated and skilled in their craft or profession, and employed and rewarded for their contributions toward the successes of others and the successful resolution of others' problems.

This process creates a framework for "collective intelligence" in two ways. First, this process provides economic incentives for people to use their personal contacts and their talents (social skills, business acumen, and technical capabilities) to help other people advance their careers or businesses. Secondly, it creates discussions between company insiders and outside professionals. These discussions create new ideas, new areas of research and investment, and new jobs.

This aspect of the invention should make it easy for people to find jobs because hundreds, perhaps thousands, of people will be looking at the individual's profile/desired job to see if they can offer them an introduction that might lead to a job which would result in a referral fee for the person making the introduction. Secondly, we can expect people within companies to search the internal job board to see if there is a job that some outsider might qualify for, interview for and accept, and then they would search the website to make a match and offer an introduction. Thirdly, we can expect companies to offer to pay the "job reward" to place an existing employee with another firm, as an outplacement alternative. The bottom line is that this website will drive employee turnover and higher pay. In addition, it will create a new source of income, as referral fees will likely be five to ten percent of annual pay. This aspect of the invention offers retirees an opportunity to help people advance their careers while getting paid for making the connection that resulted in a job.

This job-matchmaking should be very popular because people have the opportunity to make thousands of dollars with very little investment of time and money and with little downside risk. Individuals have the opportunity to help someone get a new job simply by introducing someone to someone else and then get compensated with thousands of dollars if that person starts a new job at that company. The companies are still responsible for interviewing the potential employee, performing background checks and conducting drug tests, and they can retain or release the new employee depending on their performance.

Currently, over 60% of new jobs are obtained through networking, and the time between jobs is about four months. The method utilizes a website, which uses jobs-oriented social networking with economic incentives, will speed up and expand the amount of jobs-oriented networking. Job seekers can potentially have hundreds of job finders reviewing their employment goals and will receive many offers for personal introductions if they have realistic job expectations and most or all of the qualifications needed for their intended new job.

This website-implemented method allows job seekers an anonymous way of conducting a job search and an effortless way of expanding their business contacts. It also allows retirees a means to seek extra income either by re-entering the workforce or by earning referral fees by making job introductions that result in new jobs.

Many companies encourage employees to recommend good potential employees and sometimes pay them a finder's fee if a job is taken. The method of the invention permits a potential new employee, not the company, to set and pay the job reward. Company insiders may need to inform their employer of any potential conflict of interest due to the existence of a personal introduction contract with a potential employee. On the other hand, these introductions may yield two payoffs—one from the company and one from the individual. We can expect people within companies to search their internal job board to see if there is a job that some outsider might qualify for, interview for and accept, and then they would search the website to make a match and offer an introduction.

The website-implemented method will incentivize social networking as it is driven by economics, helping people make more money. Businesses could see slightly higher turnover but increased innovation and profits as hiring and termination costs are lowered by the ease of getting a new job through this method. The discussions between company insiders and potential hires could generate new business ideas and new proposals for business initiatives. This method will reduce hiring costs as the need to pay headhunter fees is reduced, and companies could offer to pay the "job reward" to place an existing employee with another firm, as an outplacement alternative. Additionally, churches and state and federal governments could employ the method to sponsor unemployed individuals by offering to pay or subsidize the job reward for those individuals. These incentives will help to reduce unemployment.

The possibility of receiving referral fees will incentivize individuals to make personal introductions between their contacts at specific companies and those seeking a job or a sale at those companies. This social networking provides opportunities for conversations on technology, productivity, business development, and professional opportunities. These conversations can lead to job interviews or introductions to hiring or purchasing managers, but they can also create new ideas and perceived market opportunities that drive business plans and capital formation. As a result, these new ideas can create new job, funding or sales opportunities. These opportunities cause internal and external job, funding or customer finders to network and, for employment opportunities, seek out good people to fill those positions, drawing the best talent to the best opportunities and opening up good jobs for everyone else. More importantly, "everyone else", not just the best and brightest, can use this method to enlist the help of others in their search for work, funding, customer or sales leads.

In one aspect, a job seeker uses the promise of a job reward or a "contingent referral fee" at a social networking site to attract many offers for personal introductions to company insiders. From these offers, the job seeker chooses to contract with several people rather than a single headhunter. The contract uses a "contingent referral fee" inasmuch as no fee is paid unless the person starts a job at the company cited in the agreement, and the contract is a "single party show" contract inasmuch as the agreement applies to a single company for a set period of time. What is new is that anyone, not just a headhunter or professional agent, can contract to provide a personal introduction to a company insider, perhaps to him/herself. The job seeker may end up with dozens of electronically approved contracts for dozens of personal introductions, resulting in dozens of job interviews. As long as the job seeker is limited to a single personal introduction contract per company and the job seeker only starts a single job within the designated period, only one referral fee would need to be paid. A unique feature of the contract is that this is not an agency agreement, so no representation is implied or established. Rather, the fulfillment of the contact is contingent on only two events happening—an introduction to a company insider is made and a job is started at that company within the timeframe specified in the contract. If both events happen, the job seeker is required to pay the contingent referral fee. In some embodiments, the job seeker doesn't have to pay any money up front, and only has to make partial payments over time after they start their new job.

This process is applied in a similar fashion to seeking and acquiring new business customers and seeking and acquiring business funding. See FIG. 2 and FIG. 3.

Figure 1B:
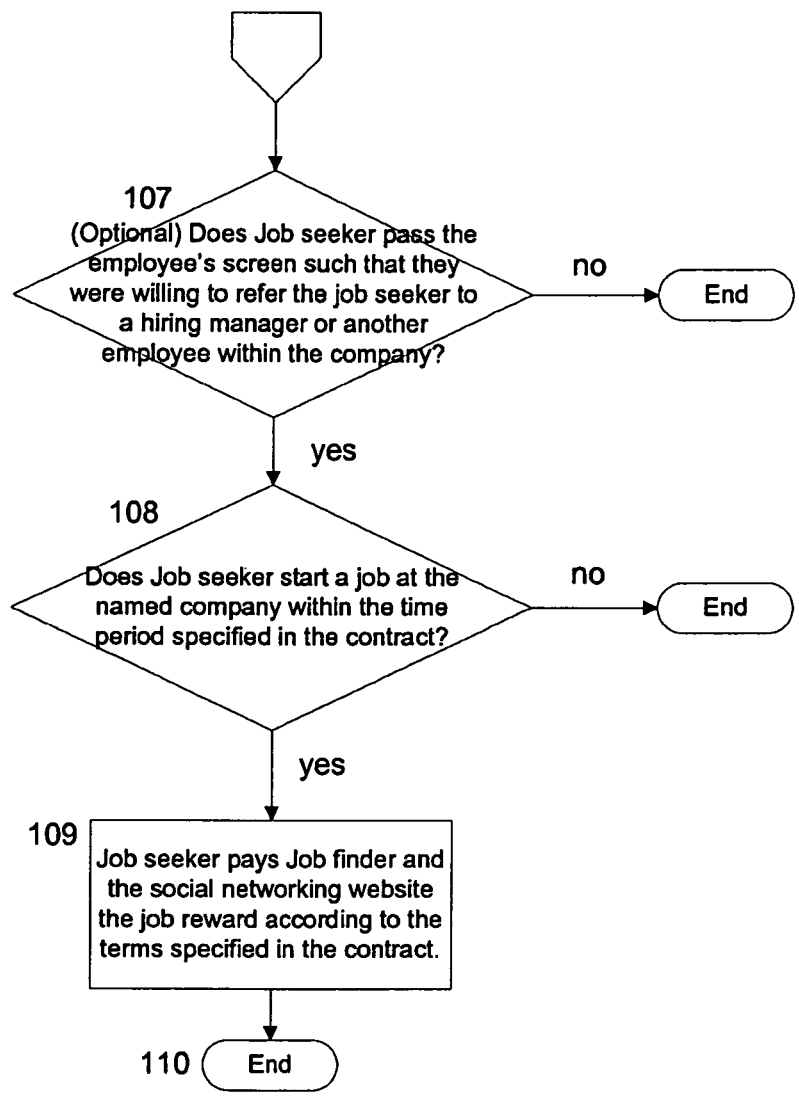

The following description is with reference to FIG. 1.

101. The job seeker signs up at the social networking website, choosing their profession and choosing a city or region where they would like to start a new job. They agree to the "terms of use" which include a fraud clause and the site's exclusive use of the database. They choose or are assigned a unique anonymous identity and a mailbox at the site. Job finders sign up for mailboxes in a similar fashion.

102. The individual specifies an ideal job and sets a job reward (either an amount or a percentage, typically two to ten percent of annual pay), the fee that would be paid if they started a new job that met their expectations. This concept also applies to salespeople or business representatives looking for sales leads and businesses or non-profits looking for funding. (See FIGS. 2 and 3.) They name their preferred employer(s). They are also given an opportunity to submit a professional profile, identifying why an employer might want to hire them. This profile includes their education, professional experience, and certification as well as a personal branding statement.

103. Job "finders" can search the site by profession and location or by preferred company name. There they find single line records of job seekers' identity codes, job rewards, ideal job titles, and preferred companies. Job finders view the job seeker's job profile and click on "Make me an offer" to offer a personal introduction to a company insider. The website asks for the name of the company. After the company name is entered, the website asks the job finder to confirm the proposed introduction. Once confirmed, an email is sent to the job seeker's "Offers" email in-box. This search step can also apply to salespeople or business representatives looking for sales leads and businesses or non-profits looking for funding.

104. The job seeker can either accept or reject the emailed offer of a personal introduction. If the job seeker accepts, a contract is formed, including its terms, conditions, and contingencies. The website archives the contract and forwards the job seeker's preferred contact information to the job finder. Other simultaneous contracts may be formed with the same or other job finders and job seekers. However, the contract specifies that job finder has an exclusive contract (typically for 4 months) for that company for that job seeker if a personal introduction occurs within the period specified in the contract (typically within about one month to six weeks).

105. The terms of the contract are such that no personal introduction is guaranteed. Typically, a job "finder" will want to pre-screen the applicant before setting up a meeting for the introduction with the company insider.

106. If the job seeker passes the pre-screen, the job finder sets up a meeting at a safe public location to introduce the job seeker to the company insider. The company insider may be a relative, friend, business associate or a personal acquaintance from a social networking website. The company employee is privy to the company's culture, internal job board, organizational structure and business plans. They are in a unique position to judge what talents and skills are valued at this time by the company. Without divulging insider information, they can let someone know how to best approach the company in hopes of getting hired and how to best prepare for a job interview. Before the introduction meeting, the job finder may want to meet with the job seeker at a notary to have the contingent contract signed by both parties and have it notarized to make it "official". During the introduction meeting, the job finder may want to photograph the job seeker and company insider shaking hands as evidence that the introduction did occur.

107. The company insider may want to check out the job seeker's resume and ask a few job interview questions. If the job seeker passes the employee's screen and is considered a good job candidate, the company insider may direct the job seeker to apply for a specific job or to send their resume to a specific hiring manager. They may introduce the job candidate to others within the company, leading to more discussions and potentially a job interview. A job interview does not guarantee a job offer, but multiple job interviews may result in one or more job offers.

108. Even an accepted job offer does not trigger a referral fee payment. Only a started job completes the job finder's portion of the contract and triggers the job seeker's obligation to pay the referral fee specified in the contract. Sometimes applicants may fail the company's drug test, security screening, or legal work status or the applicant may choose to pursue other career opportunities. Company records and HR personnel can verify employment, proving the start of work date.

109. The standard arrangement is to have the referral fee paid within a one-year period. In one embodiment the first 10% of the referral fee is due two months after the start-of-work date and nine more payments due on the same day of the month in the nine subsequent months. The website is paid 5% of the referral fee, getting half of the first 10%. The other 95% goes to the job finder, the person making the original introduction to the company insider. The website may also offer to facilitate payments, for a fee.

10. 201. The customer seeker signs up at the social networking website, identifying the goods or services they offer and choosing a city or region where they would like to acquire new customers. They agree to the "terms of use" of the website which include a fraud clause and the site's exclusive use of the database. They choose a user name or are assigned a unique anonymous identity and a mailbox at the site. Customer finders sign up for mailboxes in a similar fashion.

Figure 2A:
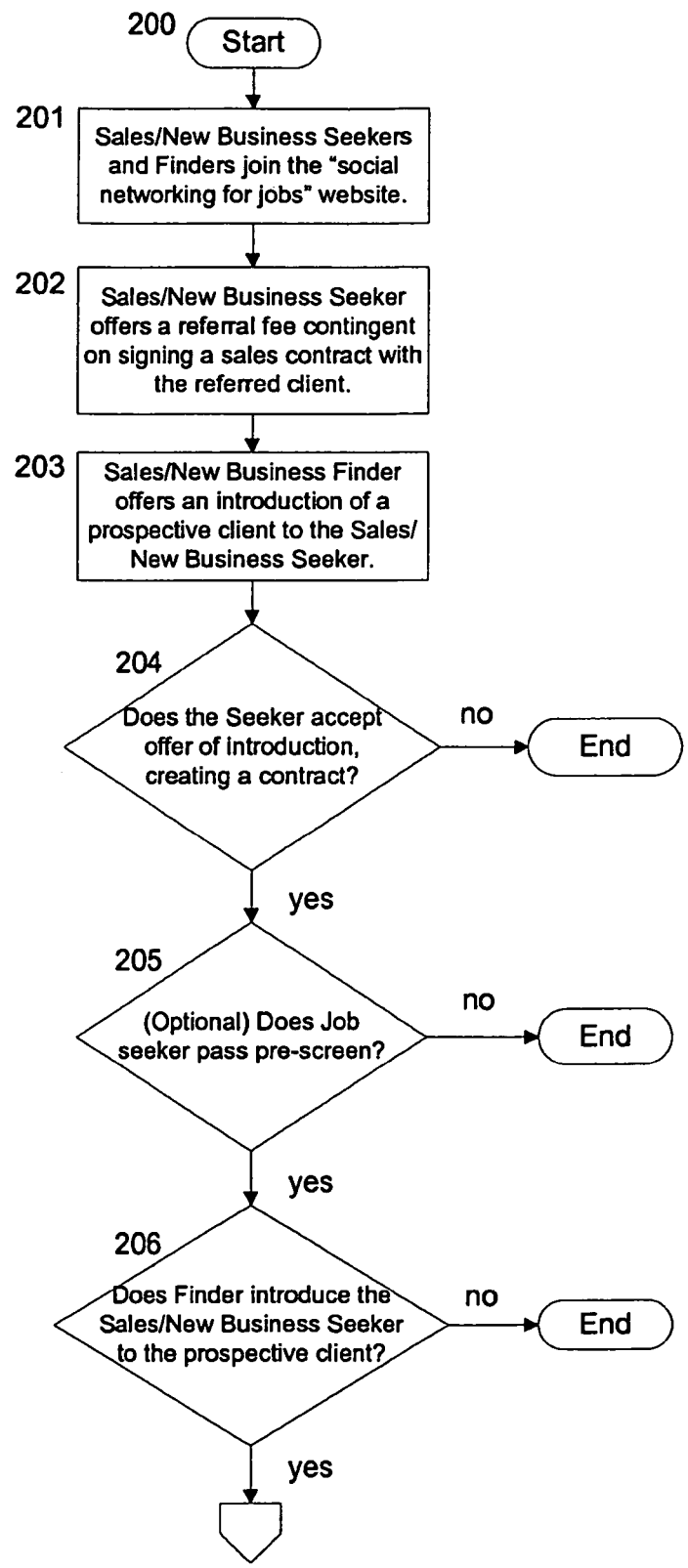
FIG. 2 is a flowchart for businesses and commissioned sales people looking to generate sales through sales leads. The website promotes and establishes contingent referral fee contracts between a salesperson or business representative and a referrer for a personal introduction to an employee at a named company. The referral fee would need to be paid to the referrer if a sale or sales contract was made with the named company within the time frame specified in the contract.
Figure 2B:
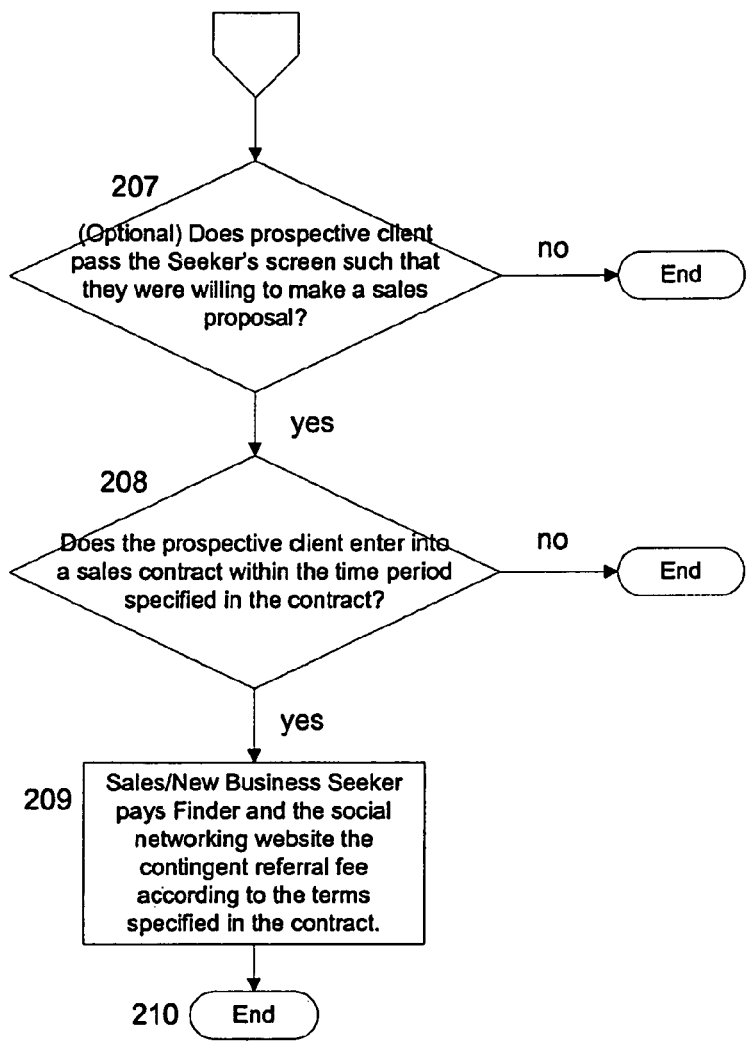

The following description is with reference to FIG. 2.

202. The individual specifies an ideal customer and sets a customer reward (either an amount or a percentage, typically one to ten percent of a typical transaction), the fee that would be paid if they sold above a minimum amount of goods or services to a new customer that met their criteria. They name their customer preferences, perhaps a particular customer(s). They are also given an opportunity to submit a business profile, identifying why a customer might want to hire them. This profile includes their expertise, licenses and certifications, and awards as well as a company branding statement.

203. Customer "finders" can search the site by business and location or by preferred company name(s). There they find single line records of customer seekers' identity codes, customer rewards, ideal customer/company names, and preferred customer criteria or titles (such as facilities manager or IT director). Customer finders view the customer seeker's ideal customer profile and click on "Make me an offer" to offer a personal introduction to a company insider. A pop-up window website asks for the name of the company. After the company name is entered, the website asks the customer finder to confirm the proposed introduction. Once confirmed, an email is sent to the customer seeker's "Offers" email in-box.

204. The customer seeker can either accept or reject the emailed offer of a personal introduction. If the customer seeker accepts, a contract is formed, including its terms, conditions, and contingencies. The website archives the contract and forwards the customer seeker's preferred contact information to the customer finder. Other simultaneous contracts may be formed with the same or other customer finders and customer seekers. However, the contract specifies that customer finder has an exclusive contract (typically for 4 months) for that company for that customer seeker if a personal introduction occurs within the period specified in the contract (typically one month).

205. The terms of the contract are such that no personal introduction is guaranteed. Typically, a customer "finder" will want have a pre-meeting with the customer seeker to pre-screen and prepare the customer seeker before setting up a meeting for the introduction with the company insider.

206. If the customer seeker passes the pre-screen, the customer finder sets up a meeting at a safe public location or at the customer's place of business to introduce the customer seeker to the company insider. The company insider may be a relative, friend, business associate or a personal acquaintance from a social networking website. The company employee is privy to the company's culture, internal customer board, organizational structure and business plans. They are in a unique position to judge what goods and services are up for bid at this time by the company. Without divulging insider information, they can let someone know how to best approach the company in hopes of getting new business and how to best prepare for a bid proposal. Before the introduction meeting, the customer finder may want to meet with the customer seeker at a notary to have the contingent contract signed by both parties and have it notarized to make it "official". During the introduction meeting, the customer finder may want to photograph the customer seeker and company insider shaking hands as evidence that the introduction did occur.

207. The company insider may want to check out the customer seeker's website and customer reviews and ask a few questions about their product offerings or services. If the customer seeker passes the employee's screen and is considered a good customer candidate, the company insider may direct the customer seeker to bid on a specific contract or to send their business card/brochure/price list to a specific purchasing manager. They may introduce the customer candidate to others within the company, leading to more discussions and potentially a bid opportunity or a customer order. No customer interview guarantees a customer order. Still, multiple customer interviews may result in one or more customer orders.

208. Even an accepted customer order does not trigger a referral fee payment. Only a completed customer transaction or an executed customer contract completes the ccustomer finder's portion of the contract and triggers the customer seeker's obligation to pay the referral fee specified in the contract. Sometimes potential customers may fail to get financing for a purchase or project or the supplier company might fail the customer company's financial background screening status or other screening criteria. (Company records can verify purchases and transaction dates.)

209. The standard arrangement is to have the referral fee due two months after the customer transaction date or two after the customer payments have been received. The website is paid 10% of the referral fee. The other 90% goes to the customer finder, the person making the original introduction to the company insider. The website also offers to facilitate payments, for a fee.

Figure 3A:
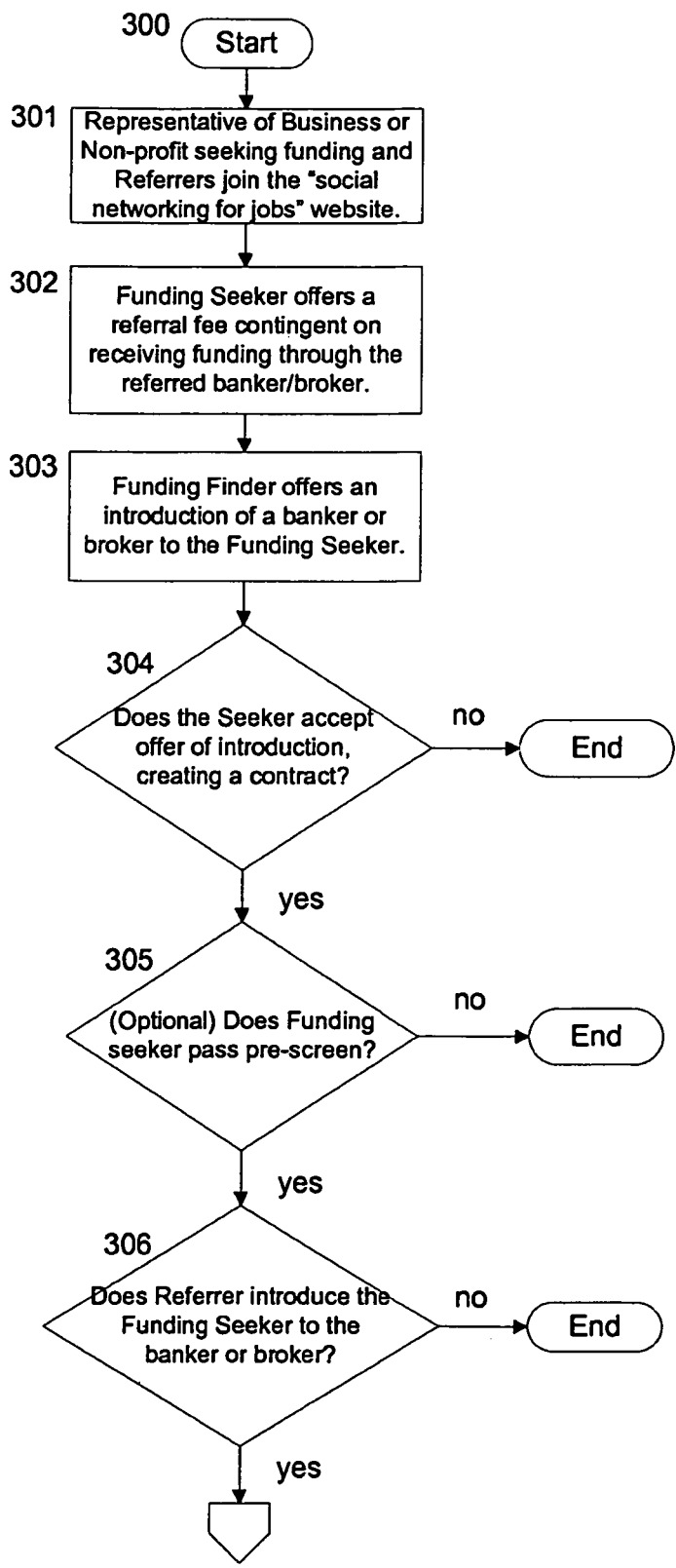
FIG. 3 is a flowchart for businesses and non-profits trying to raise funds. The website promotes and establishes contingent referral fee contracts between a business representative and a referrer for a personal introduction to an employee at a named company that is in the business of raising or providing funds for other companies. The referral fee would need to be paid to the referrer if the named company raised funds for the represented business within the time frame specified in the contract.
Figure 3B:
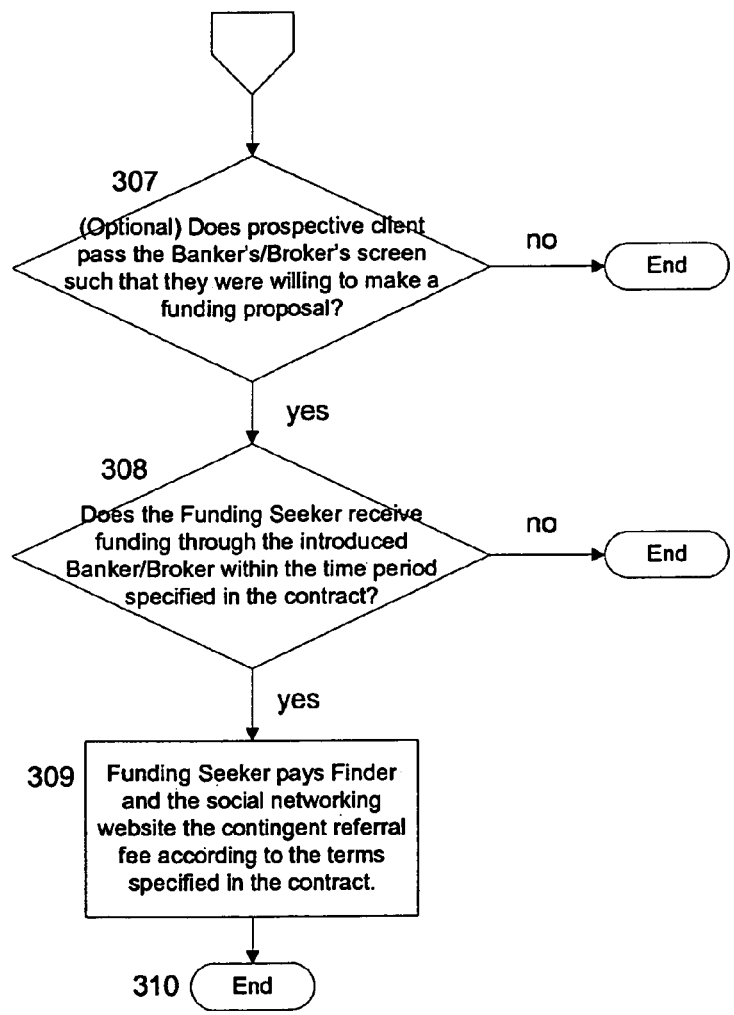

The following description is with reference to FIG. 3.

301. The funds seeker signs up at the social networking website, specifying their field of business, choosing a city or region where they are located or would like to expand their business, and whether new funding is required. They agree to the "terms of use" which include a fraud clause and the site's exclusive use of the database. They choose a user name or are assigned a unique anonymous identity and a mailbox at the site. Funds finders sign up for mailboxes in a similar fashion.

302. The funds seeker specifies an ideal amount and type of funding (grant, line of credit, bond debt, stock equity, convertible debt) desired and sets a funds reward (either an amount or a percentage, typically one to ten percent of the funding amount), the fee that would be paid if they received a new funds that met their expectations. They are also given an opportunity to submit a business profile, identifying why an individual or entity might want to invest in the business. This profile includes their key business metrics, the professional experience of their management team, and their patents and other intellectual property as well as a company branding statement.

303. Funds "finders" can search the site by business type and location or by the seeker's preferred funding company name. There they find single line records of funds seekers' identity codes, funds rewards, ideal funds types, and preferred companies. Funds finders view the funds seeker's funds profile and click on "Make me an offer" to offer a personal introduction to a company insider. A pop-up window website asks for the name of the company. After the company name is entered, the website asks the funds finder to confirm the proposed introduction. Once confirmed, an email is sent to the funds seeker's "Offers" email in-box.

304. The funds seeker can either accept or reject the emailed offer of a personal introduction. If the funds seeker accepts, a contract is formed, including its terms, conditions, and contingencies. The website archives the contract and forwards the funds seeker's preferred contact information to the funds finder. Other simultaneous contracts may be formed with the same or other funds finders and funds seekers. However, the contract specifies that funds finder has an exclusive contract (typically for 4 months) for that company for that funds seeker if a personal introduction occurs within the period specified in the contract (typically one month).

305. The terms of the contract are such that no personal introduction is guaranteed. Typically, a funds "finder" will want to pre-screen the applicant before setting up a meeting for the introduction with the company insider.

306. If the funds seeker passes the pre-screen, the funds finder sets up a meeting at a safe public location to introduce the funds seeker to the company insider. The company insider may be a relative, friend, business associate or a personal acquaintance from a social networking website. The company employee is privy to the company's culture, funding policies and target markets, organizational structure and business plans. They are in a unique position to judge what sort of loans and outside investments are valued at this time by the company. Without divulging insider information, they can let someone know how to best approach the company in hopes of getting funded and how to best prepare a loan application or investment proposal. Before the introduction meeting, the funds finder may want to meet with the funds seeker at a notary to have the contingent contract signed by both parties and have it notarized to make it "official". During the introduction meeting, the funds finder may want to photograph the funds seeker and company insider shaking hands as evidence that the introduction did occur.

307. The company insider may want to check out the funds seeker's resume and credit history and ask a few funding questions. If the funds seeker passes the employee's screen and is considered a good loan or investment candidate, the company insider may direct the funds seeker to apply for a specific loan or to send their loan application or business plan proposal to a specific manager. They may introduce the funds seeker to others within the company, leading to more discussions and potentially a funding proposal. No introduction guarantees a funding offer. Still, having multiple meetings with company managers and vice-presidents may markedly improve the odds of getting a funding offer.

308. Even an accepted funding offer does not trigger a referral fee payment. Only a funding event (receipt of funds) completes the funds finder's portion of the contract and triggers the funds seeker's obligation to pay the referral fee specified in the contract. Sometimes loan applicants may fail the funding company's due diligence process—with misrepresentations on the loan application, with insufficient collateral or poor credit history, or with legal problems. (Funding company records can verify funding events, proving the receipt of funds.)

309. The standard arrangement is to have the referral fee paid within two months after the receipt of funds (Partial funding would trigger partial referral fees to be paid.). The website is paid 10% of the referral fee, with the other 90% going to the funds finder, the person making the original introduction to the company insider. The website also offers to facilitate payments for a fee.

The social networking website will preferably capture and display the "job reward", the contingent referral fee chosen by the job seeker in the job seeker's profile. Examples of job rewards choices might include "$5000", "5% of annualized pay", "50% of the annualized pay increase", or "50% of the annual bonus". Customer reward choices can be anything of value, from a nominal amount to an in-kind thing of value, such as a one-week vacation at a timeshare, a Rolex watch or piece of jewelry, or 20 hours of bartered time from the customer seeker. The website may limit these choices and/or set a minimum successful-transaction fee to be paid to the website.

The website for job seekers will preferably have an "offer system" that allows a job finder to make an offer of introduction to an employee of a named company. The offer system will generate an email offer to the job seeker that the job seeker either accepts or rejects. The job finder fills in the name of the company in the field provided. The website provides standard contingent referral fee contract language in the email, pulling the "job reward" from the job seeker's profile and the "named company" from the company name field as inputted by the job finder. The offer system allows multiple outstanding offers and multiple accepted offers (company-exclusive contingent referral fee contracts) to co-exist. Offers may be limited in duration, e.g. "Once received, this offer is valid for one month." Acceptances of an offer can take several forms. The offer system may have a click button "I accept", or a check box that indicates, e.g., "By checking this box, I accept the terms of the above offer", or simply allow an e-mail reply "I accept your offer of introduction and agree to its terms". Printing out and signing the offered contract would also serve as an appropriate acceptance. The offer system may or may not require confirmation of an accepted offer before notifying the job finder. Terms and conditions should be standardized with exceptions allowed and noted. For example, most introductions will be face-to-face in a local public venue, but exceptions may be allowed and agreed to by both parties. For example, the form of an introduction may include video-conference (Skype), tele-conference, an introduction email whose content is pre-approved or written by the (job/customer/funds) seeker, or even a signed business card with a note on the back.

The website needs to have an email archive or other system such as a searchable database to prove or disprove the existence of these contingent contracts and the terms contained therein.

As part of the "terms of use" agreement, the website is able to market the job seekers and their profiles directly to companies, generating direct inquiries and driving "personal introductions" coordinated through the website's employees who would earn referral fees if jobs were started as a result.

The website is preferably organized by profession and location, facilitating networking and education and driving ad revenues for the website from ads for professional organizations, profession certification exams, specialized training firms, special interest groups, local and virtual colleges and universities, and magazines and books that target these professionals.

The website preferably has search capabilities that allow users to find other users by user name, by profession, by location, and by level of job reward.

Both the job seekers and the job finders will optionally remain anonymous within the website but are identifiable by their user name. However, company names, college names, and other professional attributes and key words in their professional profiles are searchable, generating email inquiries from both in hopes of creating discussions of common interests, perhaps leading to a personal introduction contract, and potentially to a new job requiring the payment of a referral fee.

Mentoring is actively encouraged to develop talents (social skills, business acumen, and technical capabilities) to qualify candidates for higher-paying jobs. The secure website can accommodate emails and online ads drive traffic to a webpage that matches mentors and job seekers. Webinars can also be offered as an alternative to individual mentoring. Mentoring and webinars will generate additional revenue for the website.

Job seekers are offered the opportunity to post personal digital portfolios of their research, professional articles, completed projects, and works-in-progress. This value-added service will generate additional revenue for the website.

Job seekers are offered the opportunity to post video resumes. This value-added service will generate additional revenue for the website.

In addition to facilitating payments, the website will offer to take deposits on referral fees. Deposited referral fees will assure job finders that they will be compensated if a job is conferred to the introduced job seeker.

In the context of the method as applied to finding customers, customer seekers are offered the opportunity to post personal digital portfolios of their research, professional articles, completed projects, and works-in-progress. This value-added service will generate additional revenue for the website.

Customer seekers may be offered the opportunity to post video resumes. This value-added service will generate additional revenue for the website.

In addition to facilitating payments, the website will offer to take deposits on referral fees. Deposited referral fees will assure customer finders that they will be compensated if a customer is conferred to the introduced customer seeker.

The method in the context of employment, applies the "contingent referral fee" contract in real estate to the job market. This introduces the concept of being paid by the job seeker for introducing a job finder to a company insider but only if the job seeker gets a job at that company. In another aspect, the method applies the "single party show" contract in real estate to the job market. The resulting exclusive rights apply to only one company. This enables the job seeker to start several offers of introduction to company insiders at different companies because the job seeker will normally start only one job within the time period specified in the contract, resulting in only one referral fee that needs to be paid. In situations where the job seeker accepts two or more job offers, two or more referral fees will be incurred, one for each accepted job under the terms and conditions of the contingent referral fee contract. This situation may arise in cases where the job seeker is, e.g., a consultant who can work simultaneously for two or more clients or employers. This may also arise with an individual who wishes to work at more than one job, e.g., at differing shifts for two, three or more employers or part time for two, three or more employers.

In a third aspect, the method applies market forces to jobs-based or jobs-focused website, wherein said website can be promoted or advertised as a social networking website, using, e.g., price (the contingent referral fee set by the job seeker) to drive interest (views of the job seeker's professional profile), economic activity (contingent contracts), and profit (paid referral fees). In some of these embodiments, one or more terms of the contingent referral fee the job seeker initially establishes can be renegotiated between the job seeker and job finder. In related embodiments, a job finder can establish a contingent referral fee for a job the job finder is aware of and that may be subsequently renegotiated between the job seeker and job finder. In any of these embodiments, said jobs-based or jobs-focused website will uses or include a searchable database that optionally categorizes job seekers by geography. As in real estate, many job markets are local. However, for job seekers or employers who can hire employees or consultants who work remotely, the geographic location can be less important, but would nonetheless usually be included. In any of these embodiments, said jobs-based website preferably enables users to search the company names in user profiles, including company names in the job finders' profiles. These users are the potential source of contacts that may be referred. Emails can be sent by job seekers to job finders to solicit offers of introduction. This can increase the number of introductions or offers that are ultimately made.

In some aspects, the jobs-based social networking website promotes advancement within a profession by separating user profiles by profession. Here users see how their professional peers differentiate themselves within their profiles. These comparisons could serve to encourage education and certification as appropriate or needed.

In related embodiments, said jobs-based or jobs focused website promotes mentorship by providing potential matches of mentors and mentees within a local geographical market. In these embodiments, both parties are incentivized and can enter into the same basic contract as the other job seekers and job referrers with similar job-focused terms or with a focus on other outcomes, e.g., attainment of a professional credential that is attained based at least in part on the mentor's assistance, professional experience or contacts.

In these embodiments, said jobs-based website includes and promotes the use of digital portfolios to differentiate user profiles. This is preferably a value-added for-fee service offered by the website. Similarly, said jobs-based website can include and promote the use of video resumes to differentiate user profiles. This is also preferably provided as a value-added for-fee service offered by the website.

In other embodiments where the method applies market forces to jobs-based or jobs-focused website, wherein said website can be promoted or advertised as a social networking website, using price (the contingent referral fee set by the job seeker and/or job finder) to drive interest (views of the job seeker's professional profile), economic activity (contingent contracts), and profit (paid referral fees), one or more of the following features or elements can be included: (1) said jobs-based website promotes education and professional affiliation as a means of obtaining the skills necessary for job advancement. Those users that are adding or modifying their profiles will see ads promoting education and professional affiliation. The click-throughs on the ads will generate income for the website;

(2) said jobs-based website provides privacy by not disclosing the identity of jobseekers and only disclosing the user-defined user name and user profile;

(3) said jobs-based social networking website uses a fraud clause requiring timely notice of a started job at the company named in the contingent contract. This clause is intended to improve compliance;

(4) said jobs-based social networking website provides the website owner with profit potential by allowing the use of the user profiles in a database used by a companion website geared to providing employers with potential job candidates. Employers would offer introductions as a means to gaining access to the job candidates, but the website owner would get the referral fee if the introduction resulted in a job for that job candidate. This use would be permitted by the website's "terms of use" contract; and/or (5) said jobs-based social networking website allows the acceptance and notification of referral fee deposits to improve interest in a particular job seeker's profile and to improve the website's profits with the interest earned on those deposits.

In the method described herein, e.g., the method to find customers for customer seekers or funds for fund seekers, the secure website is preferably internet accessible via one or more devices including personal computers, laptops, tablets, cell phones and other devices connected to the internet such as televisions, game consoles and the like. Such internet connected devices will be connected via wireless or wired connection. The secure website preferably includes an email system, but can also include text messages or communication via mobile applications as the owner or operator of the secure website or users permit.

Additional aspects or descriptions of the invention are described in the following numbered embodiments.

1. A method implemented using a website on a web-based system to obtain one or more sales or services contracts or sales or services transactions for a customer seeker and generating a contingent referral fee for a customer finder, comprising the steps of (a) establishing or providing a secure social networking website, wherein the secure website is hosted on a web server that includes an email system and a database that is internet or remotely accessible and provides search, query and display capabilities for users of the secure website; (b) obtaining a customer seeker, wherein the customer seeker is an entity, business or person seeking to sell or provide goods and/or services to customers, and a customer finder, wherein the customer finder is a business or person, who agree to terms of use of the secure website; (c) receiving into the database and storing the customer seeker's business or profession, location, description of goods and/or services offered and the contingent referral fee that the customer seeker would pay if the customer seeker concluded or performed a sales or service transaction, executed a sales and/or service contract with a named customer, wherein said sales and/or service contract may specify that performance is to be accomplished within a specified period of time; (d) the customer finder searches the database, identifies the customer seeker as a potential vendor or service provider for a specified or named entity, business and/or person that may wish to buy goods and/or services from the customer seeker (the named customer) and sends an email through the email system to the customer seeker, wherein the email offers an introduction to the named customer, optionally a company insider(s) of the named customer, via an offer system included in the secure website thereby offering a named customer-exclusive offered contract with the customer seeker, wherein the offered contract, if accepted by the customer seeker, is stored in the secure website database and wherein the offered contract (1) can be directly accepted by the named customer through the secure website or (2) thereafter according to the terms of the offered contract; and (e) the customer seeker responds through the offer system of the secure website to accept one or more of the offered contracts of step (d), thereby establishing a contractual obligation of the customer seeker to pay the contingent referral fee to the customer finder if, (i) the customer seeker is introduced by the customer finder to the named customer and the customer seeker thereafter makes a sale, provides a service or enters into a sales and/or service contract according to the offered contract with the named customer, optionally a named company, or (ii) the customer seeker issues a custom "special offer" coupon optionally with customer ID number, a "special event" invitation or an individualized sales offer contract for customers named by the customer finder, the customer finder delivers the coupons or invitations or makes the named customer aware of the offered contract and the named customer accepts the terms of the coupon, invitation, or offered contract to buy the goods and/or services described in the offered contract or according to terms negotiated between the customer seeker and named customer.

2. The method of embodiment 1 wherein the customer finder introduces the customer seeker to the named customer or gives the named customer a custom coupon or individualized sales offer contract from the customer seeker.

3. The method of embodiment 1 or 2 wherein the named customer is one or more company insiders at the named company.

4. The method of embodiment 1, 2 or 3 further comprising, (f) the named customer, optionally the named company, searches the database, identifies the customer seeker and identifies or accepts the customer seeker as a potential vendor for the goods and/or services described in the offered contract based on the information contained in the database and displayed to the named customer.

5. The method of embodiment 4 further comprising (g) the named customer, optionally the named company, offers the customer seeker a bid opportunity, optionally a request for quote, an opportunity to make a sales presentation or present one or more sales offers and/or otherwise present to the named customer the customer seeker's goods and/or services according to the offered contract;

6. The method of embodiment 5 further comprising (h) the customer seeker makes a bid or sales offer according to the offered contract to the named company, the named company accepts the bid and executes a sales contract or makes a purchase, and the offered contract of step (d) becomes a binding contract that obligates the customer seeker to pay the contingent referral fee according to its terms, wherein the secure website is utilized to facilitate payment of the contingent referral fee if requested by the customer seeker or as otherwise required by the terms of the offered contract between the customer seeker and the customer finder.

7. The method of embodiment 6 further comprising (i) paying the owner of the secure website a use fee by the customer seeker and/or customer finder according to the terms of the binding contract of step (h).

8. The method of any of embodiments 1-7 wherein the secure website is advertised or promoted as a secure social networking website.

9. The method of any of embodiments 1-8 wherein the secure website database allows automated searching of customer seekers by geography and profession or business and displays the amount of the contingent referral fee, wherein a local customer finder identifies a customer seeker for local business opportunities.

10. The method of any of embodiments 1-8 wherein said database allows the customer finder to perform an automated search or query of the database for the attributes of product or service names, brand names, and other business or professional attributes and key words in the customer seekers' professional or business profile and the database displays customer seekers who have the searched or queried attributes, whereby email discussions of common interests are facilitated and whereby a basis is provided to the customer finder to offer to make an introduction between the customer seeker with a particular background or set of skills and the company insider.

11. The method of any of embodiments 1-8 wherein said database allows the customer seeker to perform an automated search or query of the database for company names in user profiles, including company names in the customer finders' profiles, wherein customer seekers identify customer finders who have contacts at or with desired potential named customers, to enable the sending of emails through the email system to customer finders to solicit offers of introduction.

12. The method of embodiment 11 wherein the named customer can access (1) the identity of the customer seeker and information in the database related to the customer seeker and/or (2) the offered contract including its terms and scope, only by identifying in information in the database related to the customer finder the identity of the customer seeker and/or the offered contract, wherein if the named customer and the customer seeker thereafter enter into a sales and/or service contract according to the terms of the offered contract, then the customer seeker and/or the named customer is obligated to pay the contingent referral fee according to the terms of the offered contract.

13. The method of embodiment 1, 2, 3, 4, 5, 6 or 7 or 12 wherein, once the customer seeker and/or named customer, is obligated to pay the contingent referral fee, the scope or description of goods and/or services the named customer buys from the customer seeker is (1) completely within the scope of the offered contract or (2) includes at least some goods and/or services within the scope of the offered contract and at least some goods and/or services outside the scope of the offered contract.

14. The method of embodiment 1, 2, 3, 4, 5, 6, 7, 12 or 13 wherein, once the customer seeker (and/or named customer?), is obligated to pay the contingent referral fee, the price(s) of goods and/or services the named customer buys from the customer seeker differs from the price(s) of goods and/or services in the offered contract.

15. The method of embodiment 1, 2, 3, 4, 5, 6, 7, 12, 13 or 14 wherein the offered contract specifies (1) a price for individual or collective goods and/or services or (2) that the price for individual or collective goods and/or services will be negotiated between the customer seeker and the named customer.

16. The method of embodiment 15 wherein the contingent referral fee (1) varies according to the quantity of goods and/or services the customer seeker sells, (2) is fixed regardless the quantity of goods and/or services the customer seeker sells or (3) varies depending on terms negotiated between the customer seeker and the named customer.

17. The method of any of embodiments 1-16 wherein said secure website utilizes an email-based offer system to generate a contingent referral fee contract between the customer seeker and the customer finder through email offers and acceptances with all terms and conditions of the contractual obligation to pay the contingent referral fee being specified and stored in the database, wherein either party can retrieve or obtain an official, certified or notarized hard copy or electronic of the contingent referral fee contract from the secure website, optionally from the email archives or the database for a fee.

18. The method of any of embodiments 1-17 wherein said secure website utilizes an email-based offer system to generate a contingent referral fee contract between the customer seeker and the customer finder through email offers and acceptances with all terms and conditions of the contractual obligation to pay the contingent referral fee being specified and stored in the database, wherein the customer finder pays a fee to the secure website owner or operator when the customer seeker retrieves the contingent referral fee contract from the website, optionally from the email archive or the database.

19. The method of any of embodiments 1-18 wherein said secure website database allows the searching and displaying of user profiles or profiles of customer seekers, customer finders and/or named customers by business or/profession, product or service wherein customer seekers, customer finders and/or named customers can determine how their peers customer seekers differentiate themselves within their profiles, in particular through third-party reviews/ratings, customer reviews/ratings, unique product/service offerings, pricing, discounts, warranties, financing, licensing and certification, thereby providing an opportunity for the secure website to derive revenues and profits through the use of click-through advertisements.

20. The method of any of embodiments 1-19 wherein said secure website allows potential business coaches, mentors and consultants to designate themselves as such in their user profiles, to search the database for matching businesses and professionals or individuals, optionally within their local geographical market, to connect through the website's email system, and to enter into the same contractual obligation to pay the contingent referral fee that the customer seeker may enter into with a customer finder.

21. The method of any of embodiments 1-20 wherein said database allows entry of, and searching or querying for, retrieval and display of a customer seeker's or customer finder digital portfolios online product catalog, restaurant menu, or a menu of services to differentiate the customer seeker's or customer finder's profile as a value-added for-fee service.

22. The method of any embodiments 1-21 wherein said database allows entry of and searching or querying for an audio or video presentation describing the customer seeker's goods and/or services to differentiate the customer seeker's profile as a value-added for-fee service, wherein the audio or video presentation is audio only, video, or images only or a streaming text message.

23. The method of any of embodiments 1-22 wherein said secure website allows promotion of professional affiliations of the customer seeker or the customer finder as a means to enhance the skills and contacts necessary for professional advancement, thereby providing an opportunity for the secure social networking website to derive revenues and profits via click-through advertisements.

24. The method of any of embodiments 1-23 wherein said secure website database provides for protection of the customer seeker's identity and only discloses, after a search or query of the database, a user-defined username and user profile for the customer seeker, wherein a customer seeker can conduct a search for a new customer for a sideline business or for a part-time employer without the customer seeker's current employer's knowledge thereof.

25. The method of any of embodiments 1-24 wherein said offered contract includes a fraud clause that requires notice of a sales transaction or executed sales contract with the company named in the binding contract of step (g) that would trigger the obligation to pay a contingent referral fee, optionally wherein said notice has to be provided to the customer finder within a specified period of time by the customer seeker and/or the customer finder according to the terms of the offered contract. The notice will preferably be required to be full, accurate, and timely.

26. The method of any of embodiments 1-25 wherein said secure website's terms of use allow the searching or querying for and displaying of the customer seeker's profile in a companion website database that provides professional or business profile information about the customer seeker as stipulated by a terms of use agreement that applies to users of the secure website, thereby enabling the owner of the secure website and/or the database to act as the customer finder and receive the contingent referral fee.

27. The method of any of embodiments 1-26 wherein said secure social networking website allows payment of said contingent referral fee though the use of an electronic payment system, optionally for a fee.

28. The method of any of embodiments 1-27 wherein said database allows for the storage, search and retrieval of an acceptance and notification of a referral fee deposit to improve interest in the customer seeker's profile and to improve the website's profits with the interest earned on the referral fee deposit.

30. A method implemented using a website on a web-based system for obtaining new funds for a funds seeker, and generating a contingent referral fee for a funds finder, comprising the steps of (a) establishing a secure website, wherein the secure website is hosted on a web server that includes an email system and a database that provides email and database search, query and display capabilities for the secure website, wherein the email system and database is internet or remotely accessible; (b) obtaining a funds seeker and a funds finder who agree to terms of use of the secure website; (c) the funds seeker enters into the database the funds seeker's business profile, preferred funding type and amount, preferred funding sources and a contingent referral fee that the funds seeker would pay if the funds seeker obtained a minimum level of funding from a named fund source, which the database stores; (d) the funds finder searches the database, identifies the funds seeker as a potential client and sends an email through the email system to the funds seeker, wherein the email offers an introduction to a company insider(s), optionally the funds finder himself or herself, via an offer system of the secure website thereby offering a single company-exclusive contract with the funds seeker, wherein the offered contract, if accepted by the finds seeker, is stored in the database and wherein said offered contract, if accepted, would obligate the funds seeker to pay a contingent referral fee if the funds seeker is introduced to a company insider by the funds finder, the funds seeker receives funds from the fund source according to the terms of the offered contract, optionally wherein the funds finder is qualified to receive a referral fee under FINRA regulations; (e) the funds seeker responds through the offer system of the secure website to accept one or more of the offers of step (d), wherein a contractual obligation is established and the funds seeker is obligated to pay the contingent referral fee if the funds seeker is introduced and receives funds from the fund source.

31. The method of embodiment 30 wherein the funds finder introduces the funds seeker to one or more insiders or employees at the fund source.

32. The method of embodiment 30 or 31 wherein the named fund source screens the funds seeker for suitability as an entity suitable for funding.

33. The method of The method of embodiment 30, 31 or 32 further comprising (f) the fund source offering the funds seeker a financing contract comprising a financing offer, the funds seeker accepts the financing offer and receives the funds from the named company, wherein the offered contract of step (d) becomes a binding contract, wherein the binding contract obligates the funds seeker to pay the contingent referral fee according to its terms, optionally wherein the secure website is utilized to facilitate paying the contingent referral fee if requested by the funds seeker or the funds finder or required by the terms of the binding contract; and optionally, (g1) paying the owner or operator of the secure social networking website or another designated payee a use fee according to the terms of the binding contract of step (f) or (g2) if the fund source offers the funds seeker a financing contract comprising a financing offer, the funds seeker accepts the financing offer and receives the funds from the named company, the offered contract of step (d) becomes a binding contract, wherein the binding contract obligates the funds seeker to pay the contingent referral fee according to its terms, optionally wherein the secure website is utilized to facilitate paying the contingent referral fee if requested by the funds seeker or required by the terms of the binding contract.

34. The method of embodiment 33 further comprising (h) paying the owner of the secure social networking website a use fee according to the terms of the binding contract of step (g1) or (g2).

35. The method of embodiment 30, 31, 32, 33 or 34 wherein the database allows automated searching of funds seekers by geography and business/profession and displays the amount of the contingent referral fee, whereby funds finders can identify funds seekers for funding opportunities.

36. The method of embodiment 30, 31, 32, 33, 34 or 35 wherein said database allows the funds seeker or funds finder to perform an automated search or query of the database for the attributes of company names, one or more professional attributes or key words in the funds finders' or funds seekers' professional profile and the database displays funds seekers or funds finders who have the searched or queried attributes, wherein discussions of common interests between the funds seeker and the funds finder, optionally via email exchanges through the email system, are facilitated and/or a basis is provided to the funds finder to offer to make an introduction between the funds seeker and the funding source.

37. The method of embodiment 30, 31, 32, 33, 34, 35 or 36 wherein said database allows the funds seeker to perform an automated search and/or query of the database for company names in funds finders profiles, optionally including company names in the funds finders' profiles, wherein funds seekers can identify funds finders with contacts at desired potential fund sources and/or the funds seeker sends emails through the email system to funds finders to solicit offers of introduction.

38. The method of embodiment 30, 31, 32, 33, 34, 35, 36 or 37 wherein said secure website utilizes an email-based offer system to generate a contingent referral fee contract between the funds seeker and the funds finder through email offers and acceptances with all terms and conditions of the contractual obligation to pay the contingent referral fee being specified and stored in the database, optionally wherein the funds seeker and/or the funds finder can retrieve such contracts from the website, optionally the database or the email archives for a fee.

39. The method of embodiment 30, 31, 32, 33, 34, 35, 36, 37 or 38 wherein said database allows the searching and displaying of funds seeker and/or funds finder profiles by profession or expertise, enabling funds seeker and/or funds finder to determine how their professional peers differentiate themselves within their profiles, optionally through FINRA (Financial Industry Regulatory Authority) affiliation, licensing, education, and professional certification, wherein the secure website can derive revenues through the use of click-through advertisements.

40. The method of embodiment 30, 31, 32, 33, 34, 35, 36, 37, 38 or 39 wherein said secure website allows other users who are potential business advisors, coaches, consultants, mentors and mentees to designate themselves as such in their other user profiles, to search the database for matching mentors and mentees, optionally within their local geographical market and/or within their expertise, to connect through the website's email system, and to enter into the same contractual obligation to pay the contingent referral fee that the funds seeker may enter into with the funds finder.

41. The method of embodiment 30, 31, 32, 33, 34, 35, 36, 37, 38, 39 or 40 wherein said database allows entry of and searching or querying for a funds seeker digital patent portfolio, video profile and/or resume to differentiate the funds seeker's profile as a value-added for-fee service.

42. The method of any of embodiments 30-41, e.g., embodiment 30, 31, 32, 33 or 34, wherein said secure website allows promotion of professional affiliation of the funds seeker and/or the funds finder as a means to obtain the skills and contacts helpful for raising funds, thereby providing an opportunity for the secure website to derive revenues and profits through the use of click-through advertisements.

43. The method of any of embodiments 30-42, e.g., embodiment 30, 31, 32, 33 or 34, wherein said database provides for protection of the funds seeker's identity and discloses, only after a search or query of the database, a user-defined username and user profile for the funds seeker, thereby enabling a funds seeker to conduct a search for funds for a startup or other business enterprise without the funds seeker's current employer's knowledge thereof.

44. The method of any of embodiments 30-43, e.g., embodiment 30, 31, 32, 33 or 34, wherein said secure website's single company-exclusive contract includes in the database a fraud clause that requires timely notice of receiving funds from the company named in the binding contract of step (g), optionally within a specified period of time.

45. The method of any of embodiments 30-44, e.g., embodiment 30, 31, 32, 33 or 34, wherein said secure website's terms of use allow the searching or querying for and displaying of the funds seeker's profile in a companion website database that provides financial institutions information about the funds seeker as stipulated by a terms of use agreement for the secure website's, wherein the owner or operator of the secure social networking website database can act as the funds finder and receive the contingent referral fee if an accepted offer of introduction from the owner or operator resulted in funds received from the named company for the funds seeker according to the terms of the offered contract or the binding contract.

46. The method of any of embodiments 30-45, e.g., embodiment 30, 31, 32, 33 or 34, wherein said secure website allows payment of said contingent referral fee though the use of an electronic payment system for a fee.

47. The method of any of embodiments 30-46, e.g., embodiment 30, 31, 32, 33 or 34, wherein said database allows for the storage, search and retrieval of an acceptance and notification of a referral fee deposit to improve interest in the funds seeker's profile and to improve the website's revenues or profits with the interest earned on the referral fee deposit.

48. The method of any of embodiments 30-47, e.g., embodiment 30, 31, 32, 33 or 34, wherein the funds seeker is (i) a for-profit or a non-profit business, organization or entity seeking financing, (ii) an individual seeking financing for a for-profit or a non-profit business or organization, or (iii) a federal, state, county, city or other local government branch or agency.

49. The method of any of embodiments 30-48, e.g., embodiment 30, 31, 32, 33 or 34, wherein the funding source is one or more of a for-profit or non-profit entity, a government agency, a bank, a venture capital group, a charitable trust or an Angel investor.

50. The method of any of embodiments 30-49, e.g., embodiment 30, 31, 32, 33 or 34, wherein the secure website is advertised or promoted as a social networking website.

51. The method of any of embodiments 30-50, e.g., embodiment 30, 31, 32, 33 or 34, wherein the funds finder is an individual, a consultant, an advisor or a business or service provider.

60. A method implemented using a website on a web-based system for obtaining a new job for a job seeker and generating a contingent referral fee for a job finder, comprising the steps of (a) establishing a secure social networking website, wherein the secure social networking website is hosted on a web server that includes an email system and a database that provides email and database search, query and display capabilities for the secure social networking website; (b) obtaining a job seeker and a job finder who agree to terms of use of the secure social networking website; (c) the job seeker enters into the database the job seeker's profession, professional profile, preferred job location, preferred employers and a contingent referral fee that the job seeker would pay if the job seeker started a new job at a named company within a specified period of time after an introduction to an employee of the named company, which the database stores; (d) the job finder searches the database, identifies the job seeker as a potential hire for a particular company and sends an email through the email system to the job seeker, wherein the email offers an introduction to a company insider(s), optionally the job finder himself or herself, via an offer system of the secure social networking website thereby offering a single company-exclusive contract with the job seeker, wherein the offered contract, if accepted, is stored in the secure social networking website database, which would obligate the job seeker to pay a contingent referral fee if the job seeker was introduced to a company insider by the job finder and the job seeker started a job at the named company within the period of time specified in the offered contract; (e) the job seeker responds through the offer system of the secure social networking website to accept one or more of the offers of step (d), thereby establishing a contractual obligation to pay the contingent referral fee if the job seeker is introduced, screened, interviewed and starts a job at the named company; (f) the job finder introduces the job seeker to one or more company insiders at the named company; (g) the named company screens and interviews the job seeker; (h) if the named company offers the job seeker a job, the job seeker accepts the job offer and starts the job at the named company, the offered contract of step (d) becomes a binding contract that obligates the job seeker to pay the contingent referral fee according to its terms, wherein the secure social networking website is utilized to facilitate paying the contingent referral fee if requested by the job seeker or required by the terms of the contract; and (i) the owner of the secure social networking website is paid a use fee according to the terms of the binding contract of step (h).

61. The method of embodiment 60 wherein the secure social networking website database allows automated searching of job seekers by geography and profession and displays the amount of the contingent referral fee, whereby local job finders can identify job seekers for local job opportunities.

62. The method of embodiment 60 or 61 wherein said website accessible database allows the job finder to perform an automated search or query of the database for the attributes of company names, college names, and other professional attributes and key words in the job seekers' professional profile and the database displays job seekers who have the searched or queried attributes, wherein email discussions of common interests are facilitated and wherein a basis is provided to the job finder to offer to make an introduction between the job seeker with a particular background or set of skills and the company insider.

63. The method of embodiment 60, 61 or 62 wherein said secure social networking website accessible database allows the job seeker to perform an automated search or query of the database for company names in user profiles, including company names in the job finders' profiles, thereby enabling job seekers to identify job finders with contacts at desired potential employers and enabling the sending of emails through the email system to job finders to solicit offers of introduction thereby increasing the number of offers made.

64. The method of embodiment 60, 61, 62 or 63 wherein said secure social networking website utilizes an email-based offer system to generate a contingent referral fee contract between the job seeker and the job finder through email offers and acceptances with all terms and conditions of the contractual obligation to pay the contingent referral fee being specified and stored in the database, which enables retrieval of such contracts from the email archives by either party for a fee.

65. The method of embodiment 60, 61, 62 or 63 wherein said secure social networking website database allows the searching and displaying of user profiles by profession, enabling users to determine how their professional peers differentiate themselves within their profiles, in particular through education and certification, thereby providing an opportunity for the secure social networking website to derive revenues and profits via click-through advertisements.

66. The method of embodiment 60, 61, 62 or 63 wherein said secure social networking website allows potential mentors and mentees within a local geographical market to enter into the same contractual obligation to pay the contingent referral fee that the job seeker may enter into with a job finder.

67. The method of embodiment 60, 61, 62 or 63 wherein said database allows entry of and searching or querying for job seeker digital portfolios to differentiate the job seeker's profile as a value-added for-fee service.

68. The method of embodiment 60, 61, 62 or 63 wherein said database allows entry of and searching or querying for the job seeker's video resume to differentiate the job seeker's profile as a value-added for-fee service.

69. The method of embodiment 60, 61, 62 or 63 wherein said secure social networking website allows promotion of professional affiliation as a means to obtain the skills and contacts necessary for job advancement, thereby providing an opportunity for the secure social networking website to derive revenues and profits via click-through advertisements.

70. The method of embodiment 60, 61, 62 or 63 wherein said secure social networking website database provides for protection of the job seeker's identity and only discloses, after a search or query of the database, a user-defined username and user profile for the job seeker, thereby enabling a job seeker to conduct a search for a new job without the job seeker's current employer's knowledge thereof.

71. The method of embodiment 60, 61, 62 or 63 wherein said secure social networking website's single company-exclusive contract includes in the database a fraud clause that requires timely notice of a started job at the company named in the binding contract of step (h).

72. The method of embodiment 60, 61, 62 or 63 wherein said secure social networking website's terms of use allow the searching or querying for and displaying of the job seeker's profile in a companion website database that provides employers information about the job seeker as stipulated by the secure social networking website's terms of use agreement, thereby enabling the owner of the secure social networking website database to act as the job finder and receive the referral fee if an accepted offer of introduction resulted in a started job for the job seeker.

73. The method of embodiment 60, 61, 62, 63, 64, 65, 66, 67, 68, 69, 70, 71 or 72 wherein said secure social networking website allows payment of said contingent referral fee though the use of an electronic payment system for a fee.

74. The method of embodiment 60, 61, 62, 63, 64, 65, 66, 67, 68, 69, 70, 71 or 72 wherein said database allows for the storage, search and retrieval of an acceptance and notification of a referral fee deposit to improve interest in the job seeker's profile and to improve the website's profits with the interest earned on the referral fee deposit.

80. A computer readable storage medium encoded with computer program instructions for storing or communicating one or more sales contracts or sales transactions and terms of an offered contract, comprising (a) an instruction component for receiving registration information or data from a customer seeker, a customer finder and/or a customer, the registration information including terms of duration, payment and/or other terms of an offered sales and/or service contract between the customer seeker and the customer finder, and based on the registration information, generating a transaction record for the offered contract, wherein the offered contract can become a binding contract upon the occurrence of contingencies specified in the offered contract; (b) an instruction component for (1) receiving from the customer seeker, the customer finder or the customer, via an access portal communicating with the computer readable storage medium, information indicating that the offered contract has become a binding contract and (2) generating a send instruction with associated customer seeker, customer finder and/or customer authentication data and, optionally responsive thereto, creating a binding contract record in or on the computer readable storage medium; and optionally (c), (d) and/or (e), (c) an instruction component for verifying the registration information and displaying, via the access portal, a send transaction option corresponding to the binding contract; (d) an instruction component for receiving from the customer seeker or the customer, via the access portal, a selection from the send transaction option; and (e) an instruction component responsive to the customer seeker or the customer for initiating a send transaction for a delivery of funds as specified in the offered contract or the binding contract from an electronic or other fund source, optionally Paypal, a credit card or a debit card, wherein said send transaction communicates specifications for or details of the send transaction corresponding to the selected send transaction option and the fund source.

81. The computer readable storage medium of embodiment 80 wherein the computer readable storage medium comprises (a), (b) and (c).

82. The computer readable storage medium of embodiment 80 wherein the computer readable storage medium comprises (a), (b), (c) and (d).

83. The computer readable storage medium of embodiment 80 wherein the computer readable storage medium comprises (a), (b), (c), (d) and (e).

84. The computer readable storage medium of embodiment 80, 81, 82 or 83 wherein the computer readable storage medium comprises an instruction component that enables any step or store information according to or described in any of embodiments 1-28, e.g., information according to or described in one or more of embodiment 1, 2, 3, 4, 5, 6, 7, 8, 23, 24, 25, 26, 27 or 28.

90. A computer readable storage medium encoded with computer program instructions for storing or communicating one or more sales contracts or sales transactions and terms of an offered contract, comprising (funds finder concept)

91. The computer readable storage medium of embodiment 90 wherein the computer readable storage medium comprises (a), (b) and (c).

92. The computer readable storage medium of embodiment 90 wherein the computer readable storage medium comprises (a), (b), (c) and (d).

93. The computer readable storage medium of embodiment 90 wherein the computer readable storage medium comprises (a), (b), (c), (d) and (e).

94. The computer readable storage medium of embodiment 90, 91, 92 or 93 wherein the computer readable storage medium comprises an instruction component that enables any step or store information according to or described in any of embodiments 30-52, e.g., information according to or described in one or more of embodiment 30, 31, 32, 33, 34, 35, 36, 37, 38, 46, 47, 48, 49 50, 51 or 52.

100. A method implemented using a website on a web-based system to obtain one or more sales contracts or sales transactions for a customer seeker and generating a contingent referral fee for a customer finder, comprising the steps of (a) establishing or providing a secure social networking website, wherein the secure website is hosted on a web server that includes an email system and a database that is internet or remotely accessible and provides search, query and display capabilities for users of the secure website; (b) obtaining a customer seeker, wherein the customer seeker is an entity, business or person seeking to sell or provide goods and/or services to customers, and a customer finder, wherein the customer finder is a business or person, who agree to terms of use of the secure website; (c) receiving into the database and storing the customer seeker's business or profession, location, description of goods and/or services offered and the contingent referral fee that the customer seeker would pay if the customer seeker concluded or performed a sales or service transaction, executed a sales and/or service contract with a named customer, wherein said sales and/or service contract may specify that performance is to be accomplished within a specified period of time; (d) the customer finder searches the database, identifies the customer seeker as a potential vendor or service provider for a specified or named entity, business and/or person that may wish to buy goods and/or services from the customer seeker (the named customer) and sends an email through the email system to the customer seeker, wherein the email offers an introduction to the named customer, optionally a company insider(s) of the named customer, via an offer system included in the secure website thereby offering a named customer-exclusive offered contract with the customer seeker, wherein the offered contract, if accepted by the customer seeker, is stored in the secure website database and wherein the offered contract (1) can be directly accepted by the named customer through the secure website or (2) thereafter according to the terms of the offered contract; and (e) the customer seeker responds through the offer system of the secure website to accept one or more of the offered contracts of step (d), thereby establishing a contractual obligation of the customer seeker to pay the contingent referral fee to the customer finder if, (1) the customer seeker is introduced by the customer finder to the named customer and the customer seeker thereafter makes a sale, provides a service or enters into a sales and/or service contract according to the offered contract with the named customer, optionally a named company, or (2) the customer seeker issues a custom "special offer" coupon optionally with customer ID number, a "special event" invitation or an individualized sales offer contract for customers named by the customer finder, the customer finder delivers the coupons or invitations or makes the named customer aware of the offered contract and the named customer accepts the terms of the coupon, invitation, or offered contract to buy the goods and/or services described in the offered contract or according to terms negotiated between the customer seeker and named customer.

101. The method of embodiment 100 wherein the customer finder introduces the customer seeker to the named customer or gives the named customer a custom coupon or individualized sales offer contract from the customer seeker.

102. The method of embodiment 100 or 101 wherein the named customer is one or more company insiders at the named company.

103. The method of embodiment 100, 101 or 102 further comprising, (f) the named customer, optionally the named company, searches the database, identifies the customer seeker and identifies or accepts the customer seeker as a potential vendor for the goods and/or services described in the offered contract based on the information contained in the database and displayed to the named customer.

104. The method of embodiment 103 further comprising (g) the named customer, optionally the named company, offers the customer seeker a bid opportunity, optionally a request for quote, an opportunity to make a sales presentation or present one or more sales offers and/or otherwise present to the named customer the customer seeker's goods and/or services according to the offered contract.

105. The method of embodiment 104 further comprising (h) the customer seeker makes a bid or sales offer according to the offered contract to the named company, the named company accepts the bid and executes a sales contract or makes a purchase, and the offered contract of step (d) becomes a binding contract that obligates the customer seeker to pay the contingent referral fee according to its terms, wherein the secure website is utilized to facilitate payment of the contingent referral fee if requested by the customer seeker or as otherwise required by the terms of the offered contract between the customer seeker and the customer finder.

106. The method of embodiment 105 further comprising (i) paying the owner of the secure website a use fee by the customer seeker and/or customer finder according to the terms of the binding contract of step (h).

107. The method of any of embodiments 100-106 wherein the secure website is a secure social networking website.

108. The method of embodiment 107 wherein the secure website database allows automated searching of customer seekers by geography and profession or business and displays the amount of the contingent referral fee, wherein a local customer finder identifies a customer seeker for local business opportunities.

109. The method of any of embodiments 100-108 wherein said database allows the customer finder to perform an automated search or query of the database for the attributes of product or service names, brand names, and other business or professional attributes and key words in the customer seekers' professional or business profile and the database displays customer seekers who have the searched or queried attributes, whereby email discussions of common interests are facilitated and whereby a basis is provided to the customer finder to offer to make an introduction between the customer seeker with a particular background or set of skills and the company insider.

110. The method of any of embodiments 100-109 wherein said database allows the customer seeker to perform an automated search or query of the database for company names in user profiles, including company names in the customer finders' profiles, wherein customer seekers identify customer finders who have contacts at or with desired potential named customers, to enable the sending of emails through the email system to customer finders to solicit offers of introduction.

111. The method of any of embodiments 100-110 wherein said secure website utilizes an email-based offer system to generate a contingent referral fee contract between the customer seeker and the customer finder through email offers and acceptances with all terms and conditions of the contractual obligation to pay the contingent referral fee being specified and stored in the database, wherein either party can retrieve or obtain an official, certified or notarized hard copy or electronic of the contingent referral fee contract from the secure website, optionally from the email archives or the database for a fee.

112. The method of any of embodiments 100-111 wherein said secure website database allows the searching and displaying of user profiles of customer seekers by business/profession, product or service wherein customer seekers, customer finders and/or named customers can determine how the customer seekers differentiate themselves within their profiles, optionally through third-party reviews/ratings, customer reviews/ratings, unique product/service offerings, pricing, discounts, warranties, financing, licensing and certification, thereby providing an opportunity for the secure website to derive revenues and profits through the use of click-through advertisements.

113. The method of any of embodiments 100-112 wherein said secure website allows potential business coaches and consultants to designate themselves as such in their user profiles, to search the database for matching businesses and professionals, optionally within their local geographical market, to connect through the website's email system, and to enter into the same contractual obligation to pay the contingent referral fee that the customer seeker may enter into with a customer finder.

114. The method of any of embodiments 100-113 wherein said database allows entry of, searching or querying for, retrieval and display of a customer seeker's online product catalog, restaurant menu, or menu of services to differentiate the customer seeker's profile as a value-added for-fee service.

115. The method of any of embodiments 100-114 wherein said database allows entry of and searching or querying for an audio or video presentation describing the customer seeker's goods and/or services to differentiate the customer seeker's profile as a value-added for-fee service, wherein the audio or video presentation is audio, video, images, or streaming text.

116. The method of any of embodiments 100-115 wherein said secure website allows promotion of professional affiliations of the customer seeker or the customer finder as a means to enhance the skills and contacts necessary for professional advancement, thereby providing an opportunity for the secure social networking website to derive revenues and profits through the use of click-through advertisements.

117. The method of any of embodiments 100-116 wherein said secure website database provides for protection of the customer seeker's identity and only discloses, after a search or query of the database, a user-defined username and user profile for the customer seeker, thereby enabling a customer seeker to conduct a search for a new customer for a sideline business or for a part-time employer without the customer seeker's current employer's knowledge thereof.

118. The method of any of embodiments 100-117 wherein said offered contract includes a fraud clause that requires, according to the terms of the binding contract, full, accurate, and timely notification of a sales transaction or executed sales contract with the company named in the binding contract of step (g) that would trigger the obligation to pay a contingent referral fee, optionally wherein said notice has to be provided to the customer finder within a specified period of time by the customer seeker according to the terms of the offered contract.

119. The method of any of embodiments 100-118 wherein said secure website's terms of use allow the searching or querying for and displaying of the customer seeker's profile in a companion website database that provides professional or business profile information about the customer seeker as stipulated by a terms of use agreement that applies to users of the secure website, thereby enabling the owner of the secure website and/or the database to act as the customer finder and receive the contingent referral fee.

120. The method of any of embodiments 100-119 wherein said secure social networking website allows payment of said contingent referral fee though the use of an electronic payment system, optionally for a fee.

121. The method of any of embodiments 100-120 wherein said database allows for the storage, search and retrieval of an acceptance and notification of a referral fee deposit to improve interest in the customer seeker's profile and to improve the website's profits with the interest earned on the referral fee deposit.

What is claimed is:

1. A method implemented using a website on a web-based system for obtaining new funds for a funds seeker, and generating a contingent referral fee for a funds finder, comprising the steps of
    (a) establishing a secure website, wherein the secure website is hosted on a web server that includes an email system and a database that provides email and database search, query and display capabilities for the secure website, wherein the email system and database is internet accessible;
    (b) obtaining a funds seeker and a funds finder who agree to terms of use of the secure website;
    (c) the funds seeker enters into the database the funds seeker's business profile, preferred funding type and amount, preferred funding sources and a contingent referral fee that the funds seeker would pay if the funds seeker obtained a minimum level of funding from a named funding source, which the database stores and transforms to searchable data in the database on the server;
    (d) the funds finder searches the database and retrieves from the database information that identifies the funds seeker as a potential client and sends an email through the email system to the funds seeker, wherein the email offers an introduction to a company insider(s), wherein the funds finder himself or herself is not a company insider or an owner or operator of the secure website, via an offer system of the secure website thereby offering a single company-exclusive contract with the funds seeker, wherein the offered contract, if accepted by the finds seeker, is stored in the database and wherein said offered contract, if accepted, would obligate the funds seeker to pay a contingent referral fee if the funds seeker is introduced to a company insider by the funds finder and the funds seeker receives funds from the funding source according to the terms of the offered contract, optionally wherein the funds finder is qualified to receive a referral fee under FINRA regulations;
    (e) the funds seeker responds through the offer system of the secure website to accept one or more of the offers of step (d), wherein the server's database is tangibly transformed to contain a searchable single company-exclusive contract that obligates the funds seeker to pay the contingent referral fee if the funds seeker is introduced to a company insider at the named funding source and receives funds from the funding source;
    (f) the funds finder introduces the funds seeker to one or more insiders or employees at the funding source and, optionally wherein the named fund source screens the funds seeker;
    (g) the funding source offers the funds seeker a financing contract comprising a financing offer, the funds seeker accepts the financing offer and receives the funds from the named company, wherein the offered contract of step (d) becomes a binding contract that is stored in the database, wherein the binding contract obligates the funds seeker to pay the contingent referral fee to the funds finder according to its terms, optionally wherein the secure website utilizes an electronic payment system to facilitate paying the contingent referral fee if requested by the funds seeker or the funds finder or if required by the terms of the binding contract; and
    (h) paying the owner or operator of the secure social networking website or another designated payee a use fee, optionally a portion of the contingent referral fee, according to the terms of the binding contract of step (e) or according to the terms of use of the website of step (b) through the use of an electronic payment system, wherein
    (1) the database allows automated searching of funds seekers by geography and business/profession and displays the amount of the contingent referral fee, whereby funds finders can identify funds seekers for funding opportunities.
    (2) the database allows the funds seeker or funds finder to perform an automated search or query of the database for the attributes of company names, one or more professional attributes, or key words in the funds finders' or funds seekers' professional profile and the database displays funds seekers or funds finders who have the searched or queried attributes, wherein discussions of common interests between the funds seeker and the funds finder, optionally via email exchanges through the email system, are facilitated and/or a basis is provided to the funds finder to offer to make an introduction between the funds seeker and the funding source, (3) the database allows entry of and searching or querying for a funds seeker digital patent portfolio, video profile and/or resume to differentiate the funds seeker's profile as a value-added for-fee service, (4) the database provides for protection of the funds seeker's identity and discloses, only after a search or query of the database, a user-defined username and user profile for the funds seeker, thereby enabling a funds seeker to conduct a search for funds for a startup or other business enterprise without the funds seeker's current employer's knowledge thereof, and/or (5) the secure website allows payment of said contingent referral fee though the use of an electronic payment system for a fee.

2. The method of claim 1 wherein the database allows automated searching of funds seekers by geography and business/profession and displays the amount of the contingent referral fee, wherein the funds finder can identify funds seekers for funding opportunities.

3. The method of claim 1 wherein said database allows the funds seeker or funds finder to perform an automated search or query of the database for the attributes of company names, one or more professional attributes, or key words in the funds finders' or funds seekers' professional profile and the database displays funds seekers or funds finders who have the searched or queried attributes, wherein discussions of common interests between the funds seeker and the funds finder occur through the email system, wherein a basis is provided to the funds finder to offer to make an introduction between the funds seeker and a company insider at the funding source.

4. The method of claim 1 wherein said secure website utilizes an email-based offer system to generate a contingent referral fee contract between the funds seeker and the funds finder through email offers and acceptances with all terms and conditions of the contractual obligation to pay the contingent referral fee being specified and stored in the database, optionally wherein the funds seeker and/or the funds finder can retrieve such contracts from the website, optionally the database or the email archives, for a fee.

5. The method of claim 1 wherein said database allows the searching and displaying of funds seeker and/or funds finder profiles by profession or expertise, enabling funds seeker and/or funds finder to determine how their professional peers differentiate themselves within their profiles, optionally through FINRA affiliation, licensing, education, and professional certification, wherein the secure website is enabled to derive revenues through the use of click-through advertisements.

6. The method of claim 1 wherein other users who are potential business advisors, coaches, consultants, mentors and mentees designate themselves in the database as such in their other user profiles, and the other users search the database for matching mentors and mentees within their local geographical market and/or within their expertise, communicate through the website's email system, and enter into the same contractual obligation to pay the contingent referral fee that the funds seeker may enter into with the funds finder.

7. The method of claim 1 wherein the funds seeker enters into the database, and the database stores and allows retrieval of the funds seeker's digital patent portfolio, video profile and/or resume to differentiate the funds seeker's profile as a value-added for-fee service.

8. The method of claim 1 wherein said database provides for protection of the funds seeker's identity and discloses, only after a search or query of the database, a user-defined username and user profile for the funds seeker, thereby enabling a funds seeker to conduct a search for funds for a startup or other business enterprise without the funds seeker's current employer's knowledge thereof.

9. The method of claim 1 wherein said secure website's single company-exclusive contract includes in the database a fraud clause that requires timely notice of receiving funds from the company named in the binding contract of step (g), wherein the funds seeker registers receipt of funding in the secure website's database, which stores information regarding said funding receipt within a specified period of time.

10. The method of claim 1 wherein searching or querying for and displaying of the funds seeker's profile is provided in a companion website database that provides financial institutions information about the funds seeker as stipulated by a terms of use agreement for the secure website, wherein the owner or operator of the secure social networking website database acts as the funds finder and receives the contingent referral fee after an accepted offer of introduction from the owner or operator resulted in funds received from the named company for the funds seeker according to the terms of the offered contract or the binding contract.

11. The method of claim 1 wherein the contingent referral fee is paid through an electronic payment system component of the secure website for a fee.

12. The method of claim 11 wherein said database stores, is searched and retrieves an acceptance and notification of a referral fee deposit to improve interest in the funds seeker's profile and to improve the website's revenues from the interest earned on the referral fee deposit.

13. The method of claim 1 wherein the funds seeker is (i) a for-profit or a non-profit business, organization or entity seeking financing, (ii) an individual seeking financing for a for-profit or a non-profit business or organization, or (iii) a federal, state, county, city or other local government branch or agency.

14. The method of claim 1 wherein the funds finder is qualified to receive a referral fee under FINRA regulations, and this qualification is optionally displayed in the funds finder's profile and stored in the website's database.

15. The method of claim 1 wherein the funding source is one or more of a for-profit or non-profit entity, a government agency, a bank, a venture capital group, a charitable trust or an angel investor.

16. The method of claim 1 wherein the secure website optionally is (i) configured as a social networking website, (ii) integrated into a social networking site, (iii) integrated into a crowd-funding site, an angel investor funding site, or another funding site of like investors or (iv) a separate application within one of these sites wherein the secure website optionally includes a mobile communication application for wireless communication through personal computers, laptops, tablets, cell phones or other devices connected to the internet and communications between users and wireless communication occurs via the mobile communication application.

17. The method of claim 1 wherein the funds finder is an individual, a consultant, an advisor or a business or service provider.

* * * * *